April 16, 1957  C. K. STENERSON  2,789,256
TIMING CIRCUIT
Filed Nov. 18, 1953

INVENTOR.
Charles Keith Stenerson
BY
Mueller & Aichele
Attys.

United States Patent Office 2,789,256
Patented Apr. 16, 1957

2,789,256

TIMING CIRCUIT

Charles Keith Stenerson, Chicago, Ill., assignor to Motorola, Inc., Chicago, Ill., a corporation of Illinois Application November 18, 1953, Serial No. 392,803

6 Claims. (Cl. 317—139)

This invention relates generally to electric timer systems, and more particularly to an improved tubeless timer circuit for operating a plurality of devices in sequence.

There are many instances in the field of electric control where it is desired to provide automatic timing. Various electrical circuits or mechanical devices have been utilized to provide such timing, but these systems have in general proved expensive and complicated. The electronic tube timers, although quite versatile, are no exception to this fault. Another problem is that timers utilizing the charging and/or discharging of capacitors to provide timed intervals require large capacitors or a very high voltage source in order to provide long time intervals.

It is an object of the present invention to provide an improved relay operated capacitor type timer circuit.

Another object of the present invention is to provide a simple and inexpensive electronic timing system.

Still another object of this invention is to provide an electronic sequence timer for controlling a plurality of devices and which utilizes but a single capacitor.

A further object is to provide a capacity discharge timer circuit with an increased time cycle for a given capacitor or a given operation voltage.

A feature of this invention is the provision of a timing system wherein a capacitor is charged from a potential source and is then connected in series additive relation with the source to operate a relay control device.

A further feature of the invention is the provision of a sequence timing system including a plurality of relays for operating a plurality of devices in sequence, the relays having contacts for connecting a potential source and a single capacitor charged therefrom in series additive relation with each other across each of the relay actuating coils in sequence.

Figure 1:
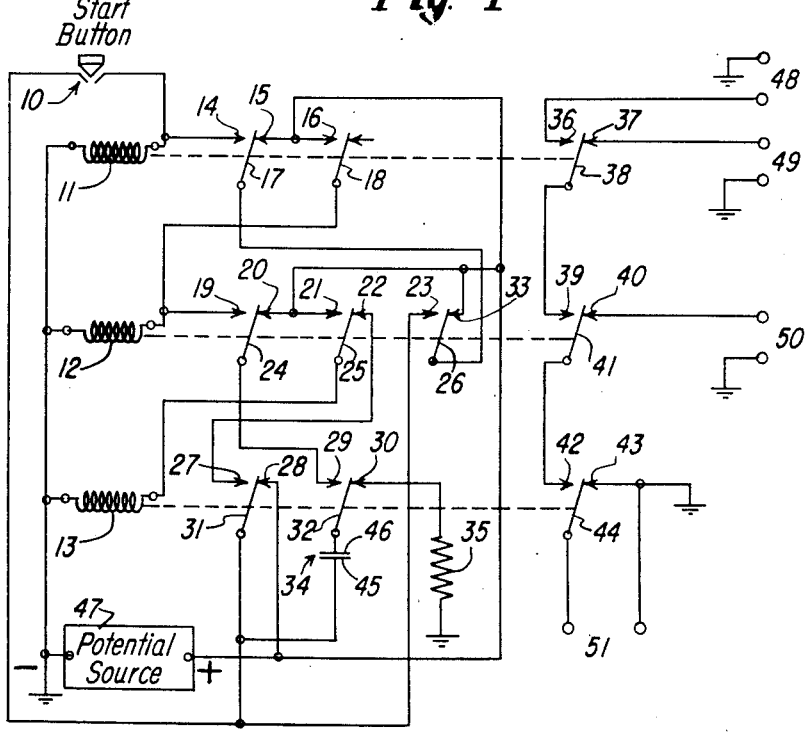
Figure 2:
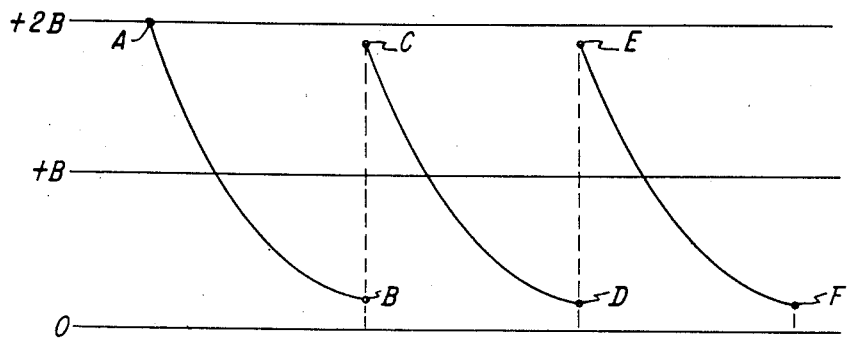

Further objects, features and the attending advantages of the invention will be apparent from a consideration of the following description when taken in connection with the accompanying drawings, in which:

Fig. 1 is a circuit diagram of the timing system in accordance with the invention; and Fig. 2 is a curve chart illustrating the operation of the system.

In practicing the invention there is provided a timing system including a plurality of relay sections each of which includes actuating means and contact means used in the operation of the system and other contact means for producing any desired control connections. The operation contacts are included in a circuit to actuate and hold all the relays upon application of the potential to a first relay. Closing of the relays serves to connect a charged capacitor in series additive relation with a potential source across the first relay. When the capacitor discharges and charges in the opposite direction, and the current therethrough diminishes, the first relay deactuates. The timed interval so provided is increased because a discharge and charge time are both included. When the first relay releases, the circuit operates to connect the now reversely charged capacitor in series additive relation with the potential source to a second relay. This second relay deactuates when the capacitor again discharges and reversely charges and the current then diminishes sufficiently. This provides a second timed interval. Release of the second relay operates to connect the condenser and potential source in series additive relation to a third relay. The charge now on the condenser is of the same polarity as at the actuation of the first relay. The condenser again discharges and reversely charges to provide a third timed interval. The process of connecting a relay across the charged capacitor in series with the potential source thereby to oppositely charge the capacitor and release the relay, which release repeats the process with respect to another relay, continues until all the relay sections have been included. The same capacitor operates to provide all the timed intervals.

Referring now to the drawing, as shown in Fig. 1, three relays are provided including coils 11, 12 and 13 and associated armatures or arms 17, 18, 38, 24, 25, 26, 41, 31, 32, and 44, shown in deenergized positions. For proper operation of the system it is necessary that the relay armatures be of the slow acting type, that is, that they are slow to fall out should their energizing potential be momentarily interrupted. It can be seen that in the deenergized positions of the relays, capacitor 34 will be charged by the potential source, or potential supply means, with the positive charge on plate 45. This is accomplished through the resistance 35, contact 30 and armature 32, and armature 31 and contact 28. The resistance 35 serves to limit the charging current of the capacitor 34 when the last relay is released.

To start the system the start button 10 may be closed to energize the first relay coil 11. This is accomplished by application of the positive potential from contact 28 through armature 31 and the switch formed by button 10 to one side of the coil 11, the other terminal of coil 11 being connected to the common point or ground. Armatures 17, 18 and 38 will then move to actuated position and into engagement with contacts 14, 16 and 36 respectively. The first relay will be held energized by the circuit through contacts 14 and 17, and contacts 26 and 33 of the second relay. The system will therefore be held in operation if start button 10 is immediately released.

The second relay coil 12 will be energized through contact 16 and arm 18 bringing arms 24, 25, 26 and 41 into engagement with contacts 19, 21, 23 and 39 respectively. When the second relay is actuated the holding circuit for the first relay will be shifted from contact 33 to contact 23 of the second relay, and through contacts 31 and 28 of the third relay. The third relay coil 13 becomes energized when armature 25, associated with relay coil 12, engages contact 21 and then contact arms 31, 32 and 44 associated with relay coil 13 are brought into engagement with contacts 27, 29 and 42. It may be seen that contacts of the preceding relay coil apply potential to the succeeding coil thus the coils are energized in sequence and the arms are held in until the timing capacitor 34 is brought into operation as will be described more fully in the ensuing paragraphs.

At this point it may be well to mention that for proper operation of the system, the connection made by start button 10 should be broken after relay 11 actuates and before relay 13 actuates. This could be accomplished by quick action of button 10 or by a breaker arm added in the relay 13 structure. The particular application and especially the means used to operate start button 10 will determine the choice here. As mentioned at the outset the relays are slow acting so that they are maintained in actuated position as energizing circuits therefor are shifted from one contact of a relay to another contact thereof as the relay operates or releases. In general it may be seen that after relay coil 11 has been energized and its associated armatures close, start button 10 no longer serves any function in the circuit.

Prior to operation of the third relay, capacitor 34 gained a charge substantially equal to the potential source as previously described, at such time, plate 45 of the capacitor has a positive polarity and plate 46 a negative polarity. Upon actuation of the third relay coil 13, the capacitor 34 is connected in series with the potential source 47 to the relay coil 11. This circuit is provided through contact 14 and arm 17 and through arm 26 and contact 23, which connects one side of coil 11 to the positive plate of capacitor 34. The negative plate 46 is joined to the positive terminal of the potential source through arm 32 and contact 29, arm 24 and contact 19, and arm 18 and contact 16. Thus, a potential equal to the sum of the voltages of the potential source and the voltage across the capacitor 34 is impressed across coil 11. This is illustrated by the point A on Fig. 2. Current will flow in this circuit to hold the first relay actuated as the capacitor 34 discharges and charges up in the opposite direction, with plate 45 becoming negative and plate 46 becoming positive. As capacitor 34 charges toward the value of the potential source, the voltage across the coil 11 and the capacitor charging current diminish until the current through coil 11 no longer holds the first relay actuated. This is shown by point B in Fig. 2. The armatures 17, 18 and 38 will then release to change the circuit connections. The release of the first relay forms the end of a first timed interval.

After the first timed interval, that is, when the first relay releases, the connection to the second relay through armature 18 and contact 16 will be broken. However, coil 12 will remain energized through the connection from the plate 46 of capacitor 34 now charged positively as previously recited, through arm 32 and contact 29, and arm 24 and contact 19. The plate 45 of the capacitor, now negative, is connected through contact 23 and arm 26, and arm 17 and contact 15 to the positive terminal of the potential source. It is apparent that the potential source and the charged capacitor are connected in series additive across coil 12 of the second relay to provide a voltage thereacross almost equal to twice the voltage of the source as indicated by point C of Fig. 2. The second relay will remain energized until the capacitor charge current reaches the minimum hold value for relay coil 12. During this time capacitor 34 will discharge and then charge so that plate 46 will be negative and plate 45 will be positive. This will decrease the voltage across the coil as indicated by point D in Fig. 2, and the current through coil 12 will reach a minimum hold value causing release of arms 24, 25, 26 and 41 thereof to change the circuit connections and to thereby provide the end of a second timed interval.

After the second interval and release of the second relay, the circuit connections are such that the capacitor 34 and potential source 47 are connected in series additive relation to coil 13 of the third relay. The voltage across the coil 13 is indicated by point E of Fig. 2. This circuit includes arm 25 and contact 22, contact 27 and arm 31, connecting the coil 13 to the plate 45 of capacitor 34, now positive. The plate 46 of capacitor 34, now negative, is joined to potential source 47 through arm 32 and contact 29, and arm 24 and contact 20. Operation here is the same as that with respect to coils 11 and 12, namely the coil 13 remains energized until the capacitor 34 discharges and reversely charges to reduce the voltage across coil 13 as shown at point F of Fig. 2. The charge current will reduce to the minimum hold value for relay coil 13 whereupon arms 31 and 32 and 44 are released allowing recharge of capacitor 34 preparatory to another cycle of operation when start button 10 is closed.

The operation has included closure of relay arms of the first relay including coil 11, then closure of the second relay including coil 12 and finally closure of the third relay including coil 13, whereupon the first relay will open after a selected time cycle, the second relay will open after a selected time cycle, and the third relay will open after approximately the same selected time cycle. Any number of relays may be provided to utilize the circuit shown thereby controlling any number of devices in sequence for the time interval governed by the value of capacitor 34, the value of potential 47, the minimum hold current of the relay coils, and the amount of resistance existing in the circuit.

One method of control is suggested in the drawing. When all the relay coils have been energized terminals 48 will be connected to output terminals 51 through contact 36 and arm 38, contact 39 and arm 41, and contact 42 and arm 44, the other connection being made through ground or the common point. This connection would continue from the time when coil 13 is energized until coil 11 becomes deenergized, this time being governed by the time interval factors just recited. When coil 11 is deenergized arm 38 engages contact 37 thereby connecting terminals 49 to the output terminals 51 through contact 37 and arm 38, contact 39 and arm 41 and contact 42 and arm 44. Upon deenergization of coil 13 the output terminals 51 are shorted out through contact 43 and arm 44 as the cycle is finished.

Although in the circuit illustrated the three time intervals provided may be of substantially the same duration, it is also possible to provide intervals of differing duration. This can be accomplished by using relay coils with different resistances or by providing a resistance in series therewith to change the rate of discharge and recharge of the capacitor. Impedance elements may also be provided in the circuit in other manners to provide some variation of the timed intervals.

It will be obvious that in addition to the connections shown for using the timer, it can be used in many other applications to provide timed intervals for various different types of equipment. Various combinations of fixed contacts and armatures may be provided on the relays so that circuit connections can be made and/or broken at desired intervals.

Thus it is seen that this tubeless electronic timer requires but a single capacitor for operating and timing any number of electric devices in sequence. Furthermore, the discharge time ordinarily associated with a given voltage capacitor and resistance combination has been greatly increased thereby providing a less expensive and less complicated sequence timer for electronic control.

Although a certain embodiment of the invention has been described which is illustrated thereof, it is obvious that various changes and modifications can be made therein without departing from the intended scope of the invention as defined in the appended claims.

I claim:

1. A timing system for operating a plurality of controls in sequence including in combination, a capacitor, a potential source, at least first and second relay devices having actuating means and contact means selectively operable to actuated and unactuated positions by said devices, and circuit means including a portion of said contact means for selectively connecting said capacitor and said potential source to said actuating means of said relay devices, said circuit means connecting said capacitor to said potential source to charge the same to a first polarity, said circuit means including starting means for initiating operation of said system to cause energization of said relay devices in sequence, said circuit means connecting said capacitor charged to said first polarity and said potential source in series in additive relation to said actuating means of said first relay device in response to actuation of all said relay devices for energizing said first relay device, said capacitor thereby being discharged through said actuating means of said first relay device and being charged to the opposite polarity to release said first relay device and establish a first timed interval; said circuit means being operative, upon release of said first relay device, to connect said capacitor charged in said opposite polarity in series additive relation with said potential source to said actuating means of said second relay device for energizing the same, said capacitor being discharged through said actuating means of said second relay device and being charged to said first polarity to release said second relay device and establish a second timed interval, and operating means including a portion of said contact means connected to said plurality of controls for operation thereof.

2. A timing system for operating a plurality of controls in sequence including in combination, capacitor means, potential supply means, at least first and second relay devices having actuating means and contact means selectively operable to complete and open circuits therethrough, and circuit means including a portion of said contact means for selectively connecting said capacitor means and said potential supply means to said actuating means of said relay devices and starting switch means for initiating operation of said system to cause energization of said relay devices in sequence, said circuit means connecting said capacitor means to said potential supply means prior to operation of said system to charge said capacitor means to a first polarity, said circuit means connecting said capacitor means charged to said first polarity and said potential supply means in series in additive relation to said actuating means of said first relay device for energizing the same in response to actuation of all said relay devices, said capacitor means being discharged through said actuating means of said first relay device and being charged to the opposite polarity to release said first relay device to thereby establish a first timed interval; said circuit means being operative upon release of said first relay device to connect said capacitor means charged in said opposite polarity in series additive relation with said potential supply means to said actuating means of said second relay device for energizing the same, said capacitor means being discharged through said actuating means of said second relay device and being charged to said first polarity to release said second relay device and establish a second timed interval, and operating means including a portion of said contact means connected to said plurality of controls for operation thereof.

3. A timing system including in combination, capacitor means, potential supply means, a plurality of relays, including first, second and final relays each having actuating means and a plurality of contact means selectively operable to actuated and unactuated positions thereby; circuit means interconnecting said capacitor means, said potential means, said actuating means and said contact means; said circuit means including a portion connecting said capacitor means to said potential supply means through a pair of contact means of said final relay in the unactuated position thereof for developing a charge of a first polarity on said capacitor means; means for actuation of said first relay, said circuit means including a portion which upon actuation of said first relay actuates said second relay and said final relay in sequence; said plurality of relays establishing a circuit through contact means thereof for connecting said capacitor means charged to said first polarity and said potential supply means in series to said first relay so that the voltages thereof are additively combined to provide current flow through said first relay for holding the same actuated, said current discharging said capacitor means and reversely charging the same to a second polarity to release said first relay and thereby establish a first timed interval; said circuit means including a portion which upon release of said first relay, connects said capacitor means and said potential supply means in series to said second relay so that the voltages thereof are additively combined to provide current flow through said second relay for holding the same actuated, said current flow discharging said capacitor means and reversely charging the same to said first polarity to release said second relay to establish a second timed interval; said circuit means including a portion which upon release of said other relays connects said capacitor means and said potential supply means in series to said final relay so that the voltages thereof are additively combined to provide current flow through said final relay for holding the same actuated, said current discharging said capacitor means and reversely charging the same to the opposite polarity to release said final relay and establish a final timed interval.

4. A sequence timing system including in combination, a capacitor, a source of potential, a plurality of relays, including first, second and final relays each having actuating means and a plurality of contact means selectively operable to actuated and unactuated positions thereby; circuit means interconnecting said capacitor, said source of potential, said actuating means and said contact means; said circuit means including a portion connecting said capacitor to said source of potential through a pair of contact means of said final relay in the unactuated position thereof for developing a charge of a first polarity on said capacitor; means for actuation of said first relay, said circuit means including a portion which, upon actuation of said first relay, actuates said second relay and said final relay in sequence; said plurality of relays establishing a circuit through contact means thereof for connecting said capacitor charged to said first polarity and said source of potential in series to said first relay so that the voltages thereof are additively combined to provide current flow through said first relay for holding the same actuated, said current discharging said capacitor and charging the same to a second polarity to release said first relay and thereby establish a first timed interval; said circuit means including a portion which upon release of said first relay, connects said capacitor and said source of potential in series to said second relay so that the voltages thereof are additively combined to provide current flow through said second relay for holding the same actuated, said current flow discharging said capacitor and charging the same to said first polarity to release said second relay to establish a second timed interval; said circuit means including a portion which upon release of said other relays connects said capacitor and said source of potential in series to said final relay so that the voltages thereof are additively combined to provide current flow through said final relay for holding the same actuated, said current discharging said capacitor and charging the same to the opposite polarity to release said final relay and establish a final timed interval.

5. A timing system for sequentially operating switch devices including in combination, a capacitor, a potential source, at least first and second electrically operated switch devices each having actuating means and contact means selectively operable to complete and open circuits therethrough, and circuit means including said contact means for selectively connecting said capacitor and said potential source in series across said actuating means of said switch devices, said circuit means including starting means connecting said capacitor and said potential source and said actuating means of said first switch device all in series relation, said first switch device being energized as current flows through said capacitor to charge the same to a first polarity, said first switch device being deenergized to operate said contact means thereof as the capacitor current diminishes; said circuit means being operative upon deenergization of said first switch device to connect said capacitor charged to said first polarity in series additive relation with said potential source across said actuating means of said second switch device, said second switch device being energized as current flows through said capacitor and said capacitor is discharged and charged to a second polarity, and said second switch means being deenergized to operate said contact means thereof as the capacitor current diminishes.

6. A timing system for sequentially operating switch devices including in combination, a capacitor, a potential source, at least first and second electrically operated switch devices each having energizing circuits and also having contact means operable thereby to complete and open circuits connected thereto, and circuit means including said contact means for selectively connecting said capacitor and said potential source to said energizing means of said switch devices, said circuit means connecting said capacitor to said potential source to charge the same to a first polarity, said circuit means including starting means operable to energize said switch devices with said second switch device energized when said first switch device is energized, said starting means also operable to connect said capacitor charged to said first polarity and said potential source in series additive relation to said energizing means of said first switch device to maintain the same energized, said capacitor thereby being discharged through said energizing means of said first switch device and being charged to a second polarity opposite to said first polarity and deenergizing said first switch device as the capacitor current diminishes; said circuit means being operative upon release of said first switch device to connect said capacitor charged to said second polarity in series additive relation with said potential source to said energizing means of said second switch device to maintain the same energized, said capacitor being discharged through said energizing means of said second switch device and being recharged to said first polarity to deenergize said second switch device as the capacitor current diminishes.

References Cited in the file of this patent
UNITED STATES PATENTS

| | | |
|---|---|---|
| 2,080,273 | Holmes | May 11, 1937 |
| 2,255,816 | Rotscheidt | Sept. 16, 1941 |
| 2,600,648 | Herrick | June 17, 1952 |
| 2,650,333 | Taylor | Aug. 25, 1953 |
| 2,685,052 | Boyer | July 27, 1954 |